United States Patent
Gudmundsson et al.

(10) Patent No.: US 9,002,849 B2
(45) Date of Patent: *Apr. 7, 2015

(54) METHOD AND SYSTEM FOR GROUPING MULTIMEDIA FILES FROM PLURAL VENDORS' SERVERS IN MEDIA STORE'S CATALOG

(71) Applicant: Cellco Partnership, Basking Ridge, NJ (US)

(72) Inventors: Agust Kr. Gudmundsson, Hackettstown, NJ (US); Jayesh Supe, Pashan (IN); Sajid Ahmed, Monmouth Junction, NJ (US); Mary P. Jelinek, Somerset, NJ (US); Adil S. Belihomji, Kendal Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,743

(22) Filed: Feb. 4, 2013

(65) Prior Publication Data

US 2013/0151377 A1 Jun. 13, 2013

Related U.S. Application Data

(63) Continuation of application No. 12/415,151, filed on Mar. 31, 2009, now Pat. No. 8,370,357.

(51) Int. Cl.
| | | |
|---|---|---|
| *G06F 7/00* | (2006.01) | |
| *G06F 17/30* | (2006.01) | |
| *G06Q 30/06* | (2012.01) | |
| *G11B 27/10* | (2006.01) | |
| *G11B 27/28* | (2006.01) | |
| *G11B 27/32* | (2006.01) | |

(52) U.S. Cl.
CPC ...... *G06Q 30/0603* (2013.01); *G06F 17/30038* (2013.01); *G11B 27/105* (2013.01); *G11B 27/28* (2013.01); *G11B 27/322* (2013.01)

(58) Field of Classification Search
USPC .................................................. 707/737, 741
See application file for complete search history.

(56) References Cited

U.S. PATENT DOCUMENTS 5,721,827 A * 2/1998 Logan et al. .................. 709/217
6,092,080 A 7/2000 Gustman (Continued)

OTHER PUBLICATIONS

Entire Prosecution of U.S. Appl. No. 12/415,151 to Gudmundsson et al. entitled "Method and System for Grouping Multimedia Files From Plural Vendors' Servers in Media Store's Catalog".

*Primary Examiner* — Tony Mahmoudi
*Assistant Examiner* — Muluemebet Gurmu

(57) ABSTRACT

A media store server provides customers' digital information devices with a catalog of multimedia content available from servers of multiple vendors. To provide a unified catalog for the store, the multimedia contents are grouped according to descriptive texts. A descriptive text for a multimedia content item or file is obtained from a vendor's catalog, and the descriptive text is standardized to generate a token for that particular multimedia content item. The multimedia content is classified in an existing catalog group corresponding to an already existent token, if the generated token matches an existent token in the catalog of the media store server. A new group for multimedia content is generated and the particular multimedia content is assigned to the new group, if the generated token does not yet exist in the catalog of the multimedia store server.

18 Claims, 7 Drawing Sheets

(56) References Cited

U.S. PATENT DOCUMENTS

| | | |
|---|---|---|
| 6,125,388 A | 9/2000 | Reisman |
| 6,128,388 A | 10/2000 | Gotoh et al. |
| 6,243,713 B1 | 6/2001 | Nelson et al. |
| 6,735,627 B2 * | 5/2004 | Urien .......................... 709/223 |
| 7,023,979 B1 * | 4/2006 | Wu et al. .................. 379/265.11 |
| 7,516,142 B2 | 4/2009 | Friedlander et al. |
| 7,546,288 B2 | 6/2009 | Springer, Jr. et al. |
| 2002/0042794 A1 | 4/2002 | Konaka |
| 2002/0083005 A1 * | 6/2002 | Lowenstein et al. ............ 705/57 |
| 2003/0200197 A1 | 10/2003 | Long et al. |
| 2005/0010848 A1 | 1/2005 | Yokokawa et al. |
| 2005/0027651 A1 | 2/2005 | DeVault |
| 2005/0055372 A1 * | 3/2005 | Springer et al. ........... 707/104.1 |
| 2005/0108481 A1 | 5/2005 | Iyengar et al. |
| 2005/0193015 A1 | 9/2005 | Logston et al. |
| 2005/0278377 A1 | 12/2005 | Mirrashidi et al. |
| 2006/0080336 A1 * | 4/2006 | Zhang et al. .................. 707/100 |
| 2006/0259434 A1 * | 11/2006 | Vilcauskas et al. ............. 705/57 |
| 2007/0061859 A1 * | 3/2007 | Okuzawa et al. ............. 725/113 |
| 2007/0168462 A1 | 7/2007 | Grossberg et al. |
| 2007/0173236 A1 | 7/2007 | Vishwanathan et al. |
| 2007/0203845 A1 | 8/2007 | Gross et al. |
| 2007/0232223 A1 | 10/2007 | Bilange |
| 2008/0092168 A1 | 4/2008 | Logan et al. |
| 2008/0104246 A1 | 5/2008 | Katz et al. |
| 2008/0133569 A1 | 6/2008 | Vu et al. |
| 2008/0159522 A1 | 7/2008 | Ericson |
| 2008/0189395 A1 | 8/2008 | Stremel et al. |
| 2008/0215319 A1 | 9/2008 | Lu et al. |

* cited by examiner

METHOD AND SYSTEM FOR GROUPING MULTIMEDIA FILES FROM PLURAL VENDORS' SERVERS IN MEDIA STORE'S CATALOG

CROSS REFERENCE TO RELATED APPLICATION

This application is a continuation of and claims priority to U.S. application Ser. No. 12/415,151, filed on Mar. 31, 2009, the entire contents of which are incorporated herein by reference.

BACKGROUND

Wireless communication devices, such as mobile handsets, pagers and other two-way messaging devices, have had the capability to receive data and/or voice from the wireless communication system. Besides this basic wireless communication functionality, other technical achievements have been integrated onto the wireless communication devices. In recent years, as the speeds of wireless communication equipments and the speed of processors increase, the wireless communication devices have been provided with complete Internet access via web browsers or application software tailored to the wireless communication. As the wireless communication devices have advanced far so as to serve as players for listening to music and viewing videos, the downloading of music and video to wireless communication devices has become widespread.

To meet needs for downloading music and video for use by their highly mobile customers, wireless communication service providers have begun to offer media store platforms from which the wireless communication device users may buy and download diverse music, video and game (music or the like) type multimedia content, even though the files for the content may actually come from a plurality of music, video and game vendors. Such a wireless communication service provider needs to provide a catalog of music or the like, for example, which categorizes music and video according to artists (or directors), albums and titles and pulls together diverse versions of the same music and video, for convenience of wireless communication device users in searching and finding their desired music and video. Consider a song as an example. The song may be performed by a number of different artists, sometimes in different musical genres, over time. Each artist may release the song performance and/or rerecord it on a different album. Each artist may release a related music video, Ringtones, one or more selected segments from the song. Each different content based on the one song will have its own descriptive text, for catalog and search purposes, and different vendors often describe each item somewhat differently, for their covers. Since music and related content often is listed in various versions of descriptive texts (variations of album, title, artist and track name) on vendors' catalogs even for the same music performed by the same artist, it is difficult to categorize music and video and pull together diverse versions of the same music or video from plural vendors' catalogs on the catalog of the media store platform in a uniform way. A similar problem may arise even within one catalog, if one item appears in multiple forms (e.g. MP3 audio, MPEG video and/or ringtone) if the descriptive texts are inconsistent.

Hence, a need exists for a method and a system that more effectively group diverse versions of music or the like from plural vendors' servers according to descriptive texts for the music or the like and provides users who want to purchase and download the music or the like with a catalog which categorizes the music or the like according to the descriptive texts.

Another need exists for piecing together and categorizing a list of music and video or the like from plural vendors' catalogs according to artists (performers or directors), album, or title and providing a harmonized catalog to wireless communication device users for easy access to diverse content.

BRIEF DESCRIPTIONS OF DRAWINGS

The following detailed description of the embodiments of the present disclosure can best be understood when read in conjunction with the following drawing figures that depict concepts by way of example, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, the present teachings may be practiced without such details. In other instances, well known methods, procedures, components, and circuitry have been described at a relatively high-level, without detail, in order to avoid unnecessarily obscuring aspects of the present teachings.

The examples described below encompass technique that groups multimedia contents for an on-line store according to descriptive texts (track, artist and album names) regarding multimedia contents (music, video, game applications, etc.). The content files reside on vendors' servers, and the respective descriptive texts are obtained from the vendors' catalogs. The exemplary technique provides a more exact and updated catalog for the media store server to store users or shoppers who want to download the multimedia contents to their digital information devices such as PCs, PDAs or mobile handsets. The processing of the text for the store catalog allows music and video to be effectively categorized in the media store catalog according to such things as artists, performers and albums (collections). The users, who want to download the multimedia contents onto their mobile handsets directly via the wireless network or indirectly via the landline network, can lookup, search and download their desired music conveniently using the media store platform for accessing the content available from the various vendors.

For a content item or file available on a vendor's server, a catalog manager in or associated with the store server is configured to add text for the item to an existing group or to create a new group, as appropriate. Each group will have a token based on descriptive text. A descriptive text for a multimedia content item or file is obtained from a vendor's catalog. The descriptive text for the multimedia content is standardized to generate a token for that particular multimedia content item. The multimedia content is classified in an existing catalog group corresponding to an already existent token, if the newly generated token matches an existent token in the catalog of the media store server. A new group for multimedia content is generated and the particular multimedia content is assigned to the newly generated group, if the newly generated token does not yet exist in the catalog of the multimedia store server. The stored descriptive text provides a link to or association for access to the actual file on the vendor's server, i.e. so when users' searches, the text comes up from the store server and selection enables user to access/download multimedia content from the vendor's server. The tokens and corresponding groups effectively link related content.

Figure 1:
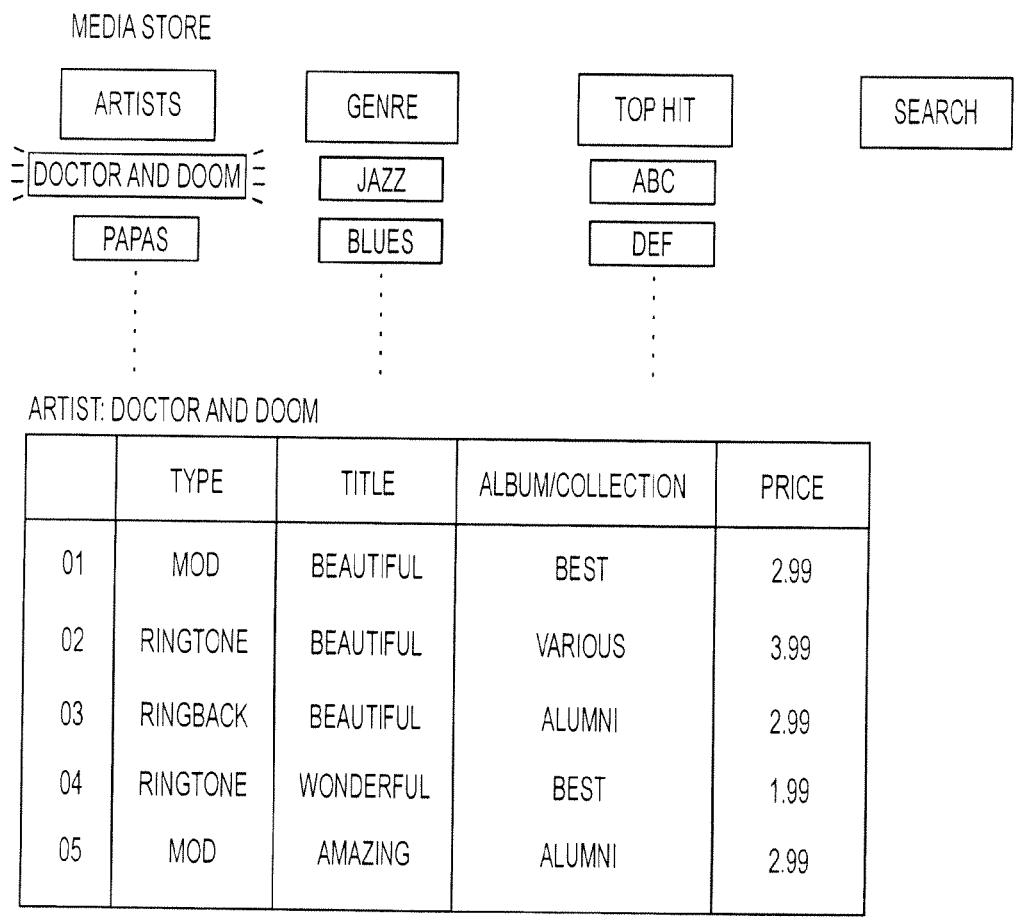
FIG. 1 illustrates an example of a page from a catalog of music and related multimedia content provided by a media store platform on a wireless communication service provider's website.

Before discussing grouping in more detail, it may help some readers to consider the multimedia store and access by mobile customers to give the grouping technique some context. FIG. 1 is an example of a page of a media store platform provided by a wireless communication service provider's website. The media store platform is an interface for users accessing a media store server 200 via PCs 300 (or mobile handsets 450) to search a catalog in the media store server, and purchase and request to download music, or the like. The media store platform may be provided at a wireless communication service provider's website in the HTML form appropriate for accessing via personal computers or laptops and may also be provided at hand-held wireless communication devices in the application interface tailored to wireless communication devices. The media store platform provides users with various functionalities for purchasing and downloading multimedia files for various types of content including music, video or the like.

The exemplary media store platform provides various functionalities menus such as "ARTISTS," "GENRE," "TOP HIT," the selection of which allows the users to look up grouped lists of music based on artists, genre, and top hit music by users, and a "SEARCH" menu, the selection of which permits the users to search for their desired music in the catalog of the media server 200. The illustrated example of the menu "ARTISTS" lists various artists names e.g. "Doctor and Doom," and "Papas" under the menu "ARTISTS." The representative menu "GENRE" lists various genres, e.g. "Jazz," and "Blues" under the menu "GENRE."

The user can select and drill down to particular content items in a number of ways. Although term searching and other techniques may be used, the example of FIG. 1 represents navigation through a series or hierarchy of menus. The exemplary media store page displays lists of music according to artists, genre and top hit music in the upper portion, and displays a list of music sung by "Doctor and Doom," in the lower portion, upon selection of the artist "Doctor and Doom" among artists listed under the menu "ARTISTS." The displayed music sung by the artist "Doctor and Doom" includes music of which titles are "Beautiful," "Wonderful," and "Amazing" in diverse types of Music On Demand (MOD), Ringtone, and Ringback tone formats, and are collected in different albums/collections "Best," "Various," and "Alumni." While the lists of music displayed on the media store platform may be grouped and obtained by the wireless communication service provider (or the media store platform provider), transactions and downloading of actual music may be performed between the plural music vendors' servers and the mobile handsets (or PCs).

In the illustrated 'music' type store example, the wireless communication service provider's media store server may not store actual music, however, the wireless communication service provider (or the media store platform provider) needs to pull together and group descriptive texts (album, track and collection names) of music obtainable from the plural music vendors' servers and enable the music from the plural music vendors' servers to be purchasable on the media store platform. The service provider's process to obtain and group descriptive texts of music from vendors' catalogs will be described below after explaining a process and a system for buying music or the like on the media store platform.

Figure 2:
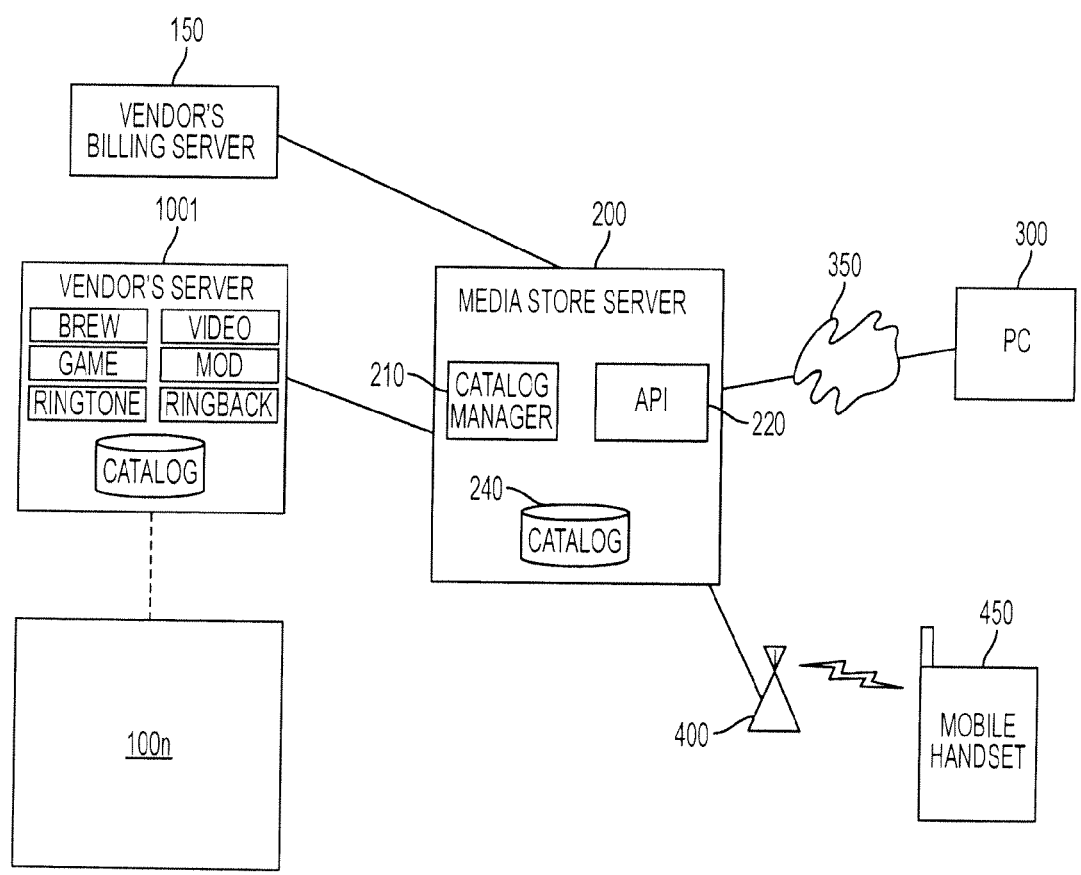
FIG. 2 is a high level functional block diagram of a system for implementing a media store platform managed by a wireless communication service provider that mediates selling and buying of music and/or other multimedia content between vendors' servers and mobile handset users (or PC users).

Continuing with the on-line music store as our example, FIG. 2 is a system for implementing a media store platform managed by a wireless communication service provider that mediates selling and buying of music related between vendors' servers and users' mobile handsets. A plurality of vendors' servers $100_1$~$100_n$ store and sell music including Ringtones, Ringback tones, and MP3, video and game, and a plurality of mobile handset users buy and download the music, video and game or the like onto their mobile handsets 450. The media store server 200 provides a media platform, an interface implemented in a form of webpage accessible by personal computers or in a form of application installed in the mobile handsets 450, and the mobile handset users buy and download the music provided by the vendors' servers onto their mobile handsets 450. The media store server 200 offers access to multimedia contents available from servers $100_1$~$100_n$ of one or more vendors. The media store server 200 provides customers' digital information devices with a catalog of the content offered through the media store server. While the mobile handset users access the media store platform and buy the music cataloged therein, actual downloading of music may be performed via a wireless network between the mobile handset 450 and the vendors' servers $100_1$~$100_n$ without involvement of the media store platform in the handling of the actual content.

Vendors' servers $100_1$~$100_n$ store music including Ringtones, Ringback tones and music on demand (MOD), videos and game software to be transferred to the wireless network upon request of the mobile handset 450. Vendors' servers $100_1$~$100_n$ employ an application for easy interfacing with the media store platform in sending and receiving data such as information on catalog and textual identification of music and video without needing to code for system interface or understand wireless applications. For example, BREW (Binary Runtime Environment for Wireless) developed by Qualcomm may be used, which is a software platform that can download and run small programs for sending messages, and sharing multimedia data (photos, video, music) without needing to code for system interface or understand wireless applications. Vendors' servers $100_1$~$100_n$ also store their own catalogs, which are respective categorized lists of music, video, etc., e.g. according to titles, artists (directors, performers) and albums (collections). Vendors' catalogs, however, have diverse versions of descriptions for even the same music, because titles and artist names are variously represented by different texts associated with different content files on the various servers.

The media store server 200 provides the media store platform to the vendors and the mobile handset users in the form of HyperText Markup Language (HTML) type webpages accessible by PCs and mobile handsets or a handset-embedded application specifically tailored to the mobile handsets. The media store server 200 has a catalog manager 210 to obtain (and search) various catalogs from the plurality of vendors' servers $100_1$~$100_n$, and optimize the obtained catalog information to produce a catalog for the media store platform itself. The catalog manager 210 is a software-implemented functional component performed by the media store server 200.

The media store server 200 is also implemented with an application programming interface (API) 220, which is composed of functionalities for interfacing with the vendors' and mobile handset users' activities. The API 220 allows a wide range of common computing functions to be written such that they may operate on many different systems, here vendors' servers $100_1$~$100_n$, PCs 300 and components of landline and wireless network systems. Each of the media store server 200 has a catalog database 240 to store the optimized catalog by the catalog manager 210. The catalog database 240 stores lists of descriptive texts of music or the like, which are obtainable from plural vendors' servers $100_1$~$100_n$, grouped according to descriptive texts (album, genre and artists), and stores identification keys assigned to each of the grouped lists of descriptive texts.

The media store server 200 and the vendor's servers $100_1$~$100_n$, for example, each include a data communication interface for packet data communication amongst the servers via Internet or Intranet transport. Each of the media store server 200 and the vendor's servers $100_1$~$100_n$ also includes a central processing unit ("CPU"), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the functions of each particular server may be implemented in a distributed fashion on a number of similar hardware platforms, to distribute the processing load.

The mobile handset users can access the media store platform provided by the media store server 200 via the PCs 300 through the Internet 350. In this case, as illustrated in FIG. 1, the web-based media platform or interface is provided to the PCs 300. The web-based media platform also can be accessed by the mobile handset 450 through a wireless communication network 400. On the other hand, a pre-installed application, which is customized to the mobile handset 450, may allow the mobile handset 450 to access the media store platform through the wireless communication network 400 and enjoy the same functionalities as those provided by the web-based media store platform.

The mobile handsets 450 may take many forms. For example, some mobile handsets may be mobile telephone stations, at least some with enhanced display and user input capabilities to support browsing and other data communications applications in addition to voice telephone service. Some of these data services may be location based and require a fix on position of the mobile station. Many high end devices offering enhanced features are referred to as "smart phones." Other mobile handsets 450 may comprise Portable Digital Assistants (PDAs) with built-in wireless communication capabilities. As another alternative, a wireless device such as a mobile transceiver having data communication capabilities may be connected to a portable computing device such as a handheld or laptop type computer.

Figure 3:
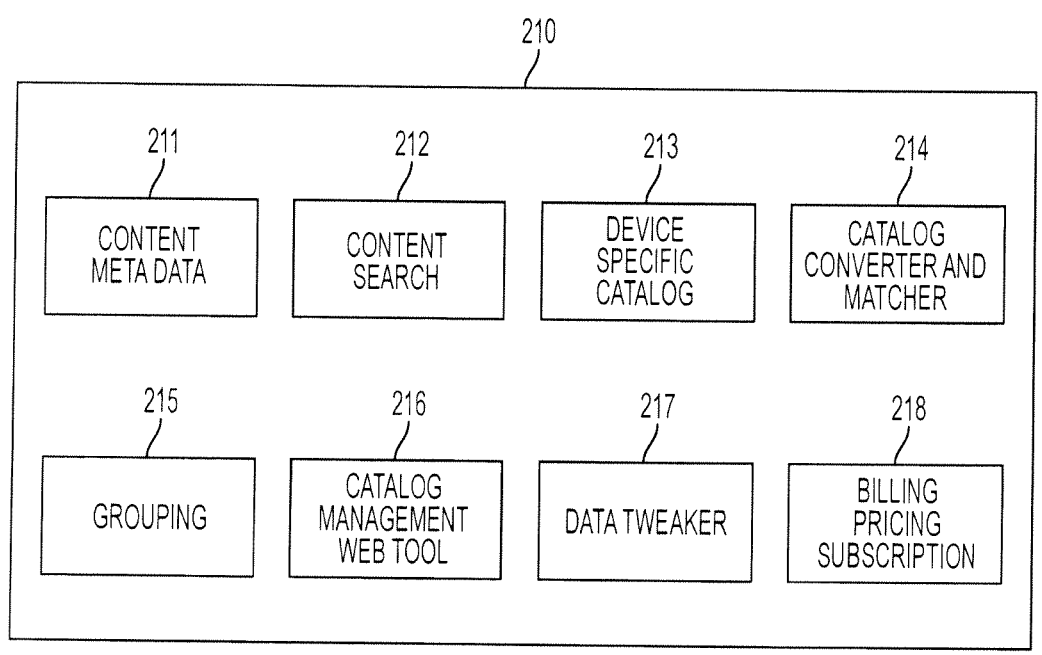
FIG. 3 is a functional diagram of the catalog manager 210 of the system of FIG. 2.

FIG. 3 is a functional diagram of the catalog manager 210 of FIG. 2. Content metadata 211 includes descriptive information about attributes of data (name, size, data type etc.), structures of data (lengths, fields, etc.) and other data (location, association and ownership, etc.) in the catalog database 240. Content search module 212 is a software-implemented functional entity, execution of which causes the media store server 200 to search and obtain various music and video descriptive texts in catalogs in the plurality of the vendors' servers $100_1$~$100_n$ periodically or non-periodically. Device specific catalog module 213 is a software-implemented functional entity, execution of which causes the media store server 200 to generate the web-based media store platform for the PCs 300 and generate the media store platform specific to the mobile handsets 450.

Figure 6:
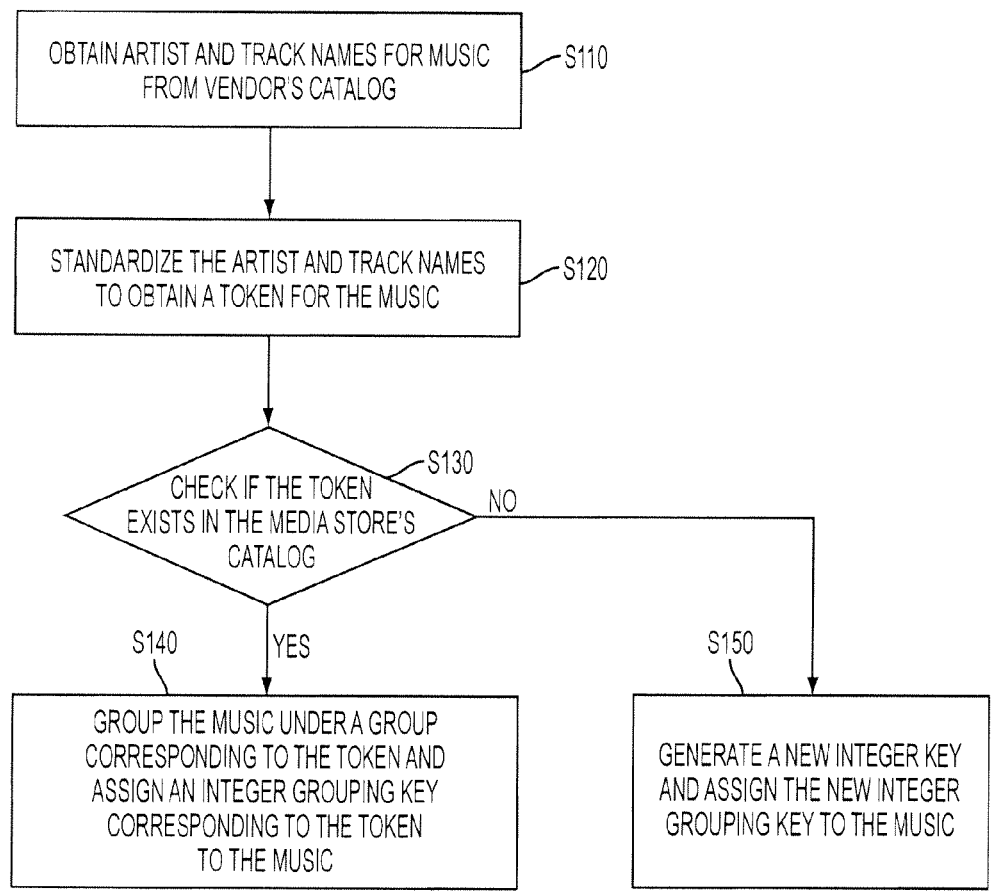
FIG. 6 is a flowchart of a process for grouping track and artist names for one or more of music content files listed in the catalogs of plural vendors' servers and storing grouped track and artist names for the content files in the media store server.

Catalog converter and matcher 214 converts descriptive texts in the catalogs obtained from the vendors' servers appropriate for the media store platform and finds and matches of same music and video titles (data) in the catalogs obtained from the vendors' servers based on the converted descriptive texts. The catalog converter and matcher 214 is a software-implemented functional entity of the media store server 200, by execution of which the media store server 200 performs the above converting and matching operations. Grouping module 215 pulls together matched descriptive texts of the music or the like from plural vendors' server and groups music corresponding to the matched descriptive texts according to e.g. artists, genre or collections. The grouping module 215 assigns integer keys to each of music of the groups for identifying each group. The catalog converter and matcher 214 and the grouping module 215, in combination, perform the process to group music from plural vendors' servers as illustrated in FIG. 6.

Catalog management web tool 216 allows media store managers to manage catalogs in the catalog database 240 and change environment (e.g. criteria for matching data in the catalog converter and matcher 214) in the media store platform. Data tweaker 217 modifies descriptive texts of music and video stored in the catalog database 240 and provides diversely categorized lists of music and video on the media store platform (e.g. rank of most downloaded music). Data tweaker 217 also pulls remote images from the vendors' servers and optimizes the images appropriate for the media store platform by using an image browser, which, for example, browses thumbnails, direct images on webpages, and icons hidden in program files. Billing, pricing and subscription module 218 deals with subscription requests from mobile handset users, billing processes after downloading of music and video into the mobile handsets 450. The catalog management web tool 216, the data tweaker 217, and the billing, pricing and subscription module 218 are software-implemented functional components of the media store server 200, by execution of which the media store server 200 performs the above discussed respective functions.

Figure 4:
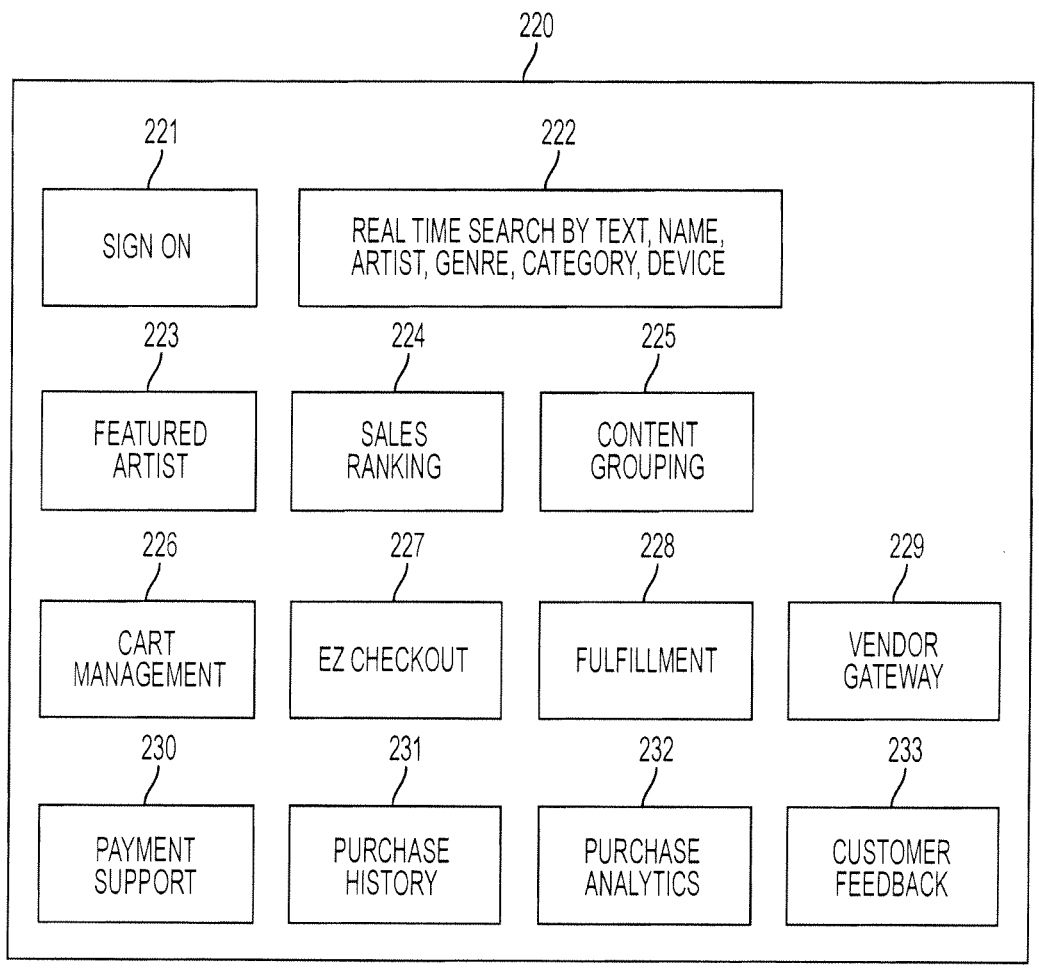
FIG. 4 is a functional diagram of the API 220 of the system of FIG. 3.

FIG. 4 is a functional diagram of the API 220 of FIG. 2. Implementation of below-discussed components of the API 220 allows the media store platform to perform diverse functionalities for interfacing with the vendors' servers 100 and mobile handsets 450 (and/or PCs 300). The sign-on module 221 deals with sign-on requests to register for the music and video download service provided by the media store platform, received from the mobile handsets 450 (or PCs 300). Real Time Search API 222 searches the catalog database 240 based on a search criteria requested by the mobile handset's 450 (or PC's 300) user, e.g. title of music and video, genre, artist, etc, upon receiving search requests sent from the mobile handsets 450 (or PCs 300), and sends the search result to the mobile handset 450 (or PC 300) that requested the search. The Real Time Search API provides the media store platform. The catalog database 240 is updated periodically or non-periodically by the process to obtain and match descriptive texts in the plurality of vendors' catalogs disclosed in FIG. 6. Featured Artist 223 and Sales Ranking 224 APIs provide lists of featured artists and sales ranking of music and video on the media store platform. Content Grouping API 225 classifies video and music into groups according to mobile handset users' requests including grouping criteria. Cart Management API 226 allows mobile handset users to logically "put" selected music and video into a "shopping cart" during shopping via the media store website before checking out the selected music and video. EZ checkout 227 enables mobile handset users to check out the selected music and video by various payments. Fulfillment API 228 sends acknowledgement of purchasing and downloading of the selected music and video content items to the mobile handsets 450 (PCs 300) after checking out and downloading. Vendor Gateway API 229 enables the media store platform to communicate with vendors' servers $100_1 \sim 100_n$ for activities between the media store platform and the media store server 200. Payment Support API 230 supports prepay, in which price for downloading music and video is paid off from pre-paid balance, and post-pay payment method, in which the price for downloading music and video is paid by credit card or debit card whenever the music and video is downloaded. Purchase History 231 and Purchase Analytics 232 APIs provide mobile handset users' purchase history and purchase statistics to show mobile handset users' propensity about music and video. Customer Feedback API 233 receives and aggregates feedback from users who downloaded videos and music.

Figure 5:
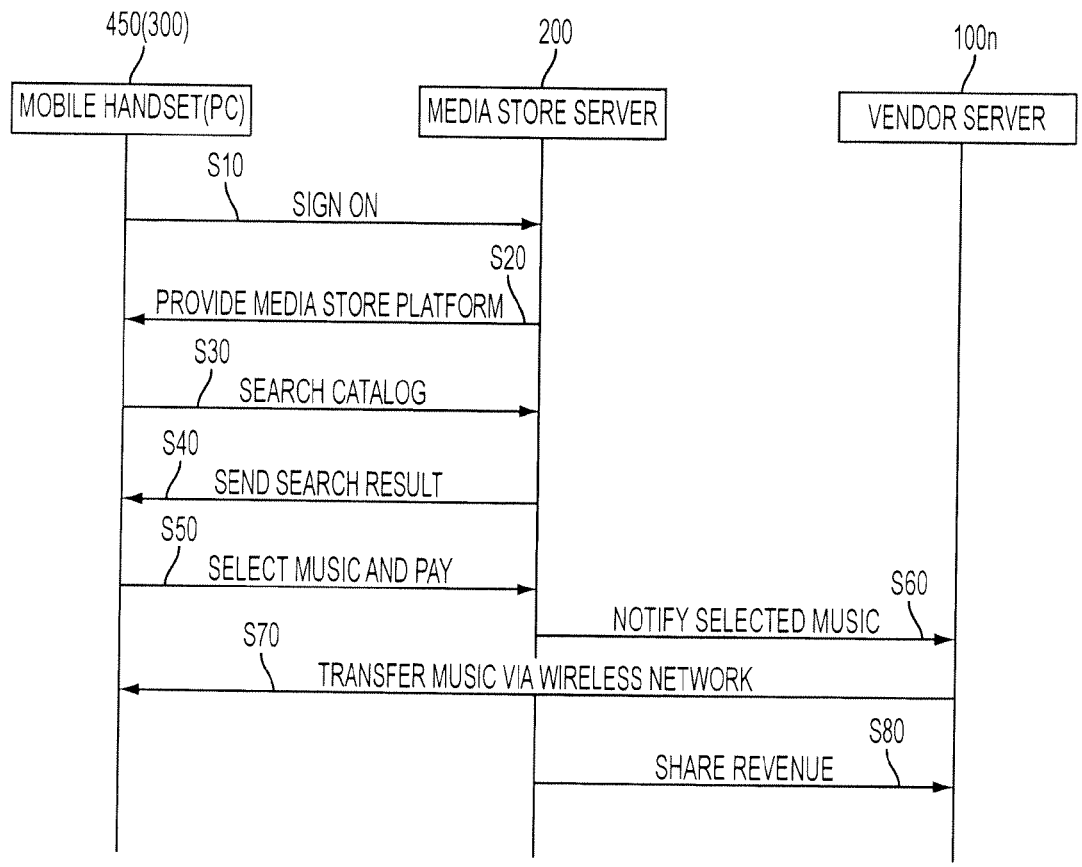
FIG. 5 is a flowchart illustrating a process performed by the media store server, a mobile handset, and the vendor's server of FIG. 2 in downloading music.

The system of FIG. 2 may offer a variety of content types. For discussion purposes, we will assume that the content relates to music although the music related content may include other associated content types, e.g. ringtone, ringback tone, video and game software. FIG. 5 is a flowchart illustrating a process performed by the media store server 200, the mobile handsets 450, and a vendor $100_n$ in downloading music (or video) related content. A mobile handset user or a customer who wants to buy and download music or video to a mobile handset 450 accesses the media store server 200 via the mobile handset 450 (or the PC 300) and signs on to get a permission to access to a media store platform provided by the media store server 200. (S10) The media store platform is an interface for users accessing the media store server 200 via the PC 300 (or mobile handset 450) to search the catalog in the media store server, and purchase and request to download music, or the like.

The media store server 200 provides the media store platform to the mobile handset 450 (or PC 300) upon request to access the media store platform via the user's sign-on. In case that the customer requested to access the media store platform via the PC 300, the webpage type media store platform is transmitted and displayed to the PC 300. (S20) When the mobile handset user requested to access the media store platform via the mobile handset, a media store platform compatible with pre-installed application, which may be implemented with mobile platform development applications such as JAVA and SYMBIAN, is transmitted to and displayed on the mobile handset 450. The mobile handset user (or customer) searches music or the like via the "SEARCH" tool in the media store platform to find his or her desired music or video. (S30) As disclosed in FIG. 1, the mobile handset user (or customer) requests the music "Beautiful" by inputting term "Beautiful," via selection of the menu "SEARCH." The searched term "Beautiful" is transferred to the media store server 200. The media store server 200 searches the music including the searched term "Beautiful" in its catalog database 240, and sends search result to the mobile handset 450 (or PC 300). (S40) The search result usually includes list of a plurality of music and video, e.g. diverse versions of the same music or video and plural music and video of which title includes the same searched term, as disclosed in FIG. 1. The mobile handset user (or customer) selects music and video to purchase among the searched result and pays the price for downloading the music or video.

The mobile handset user pays the price to the media store (the wireless communication service provider) via Pre-Pay or Post-Pay method. After payment is completed, the selection is transferred to the media store server 200. (S50) The media store server 200 notifies a vendor which stores the selected music or video of the selection of the music or video by the mobile handset user (or customer). (S60) Since the selected music or video is stored in the vendors' servers $100_n$, the selected music is delivered from the vendor's server $100_n$ into the mobile handset 450 via the Multimedia Messaging Service (MMS) through the wireless network. (S70) After downloading is completed, the media store server 200 shares the price for downloading with the vendor. (S80) The transactions for sharing the price is performed between the media store server 200 and the vendor billing server 150 and the transactions may be performed right after downloading or aggregated revenue for downloading music or video may be settled periodically.

FIG. 6 is a flowchart of a process for classifying music content files listed in the catalogs of plural vendors' servers into groups based on tracks and artist names and storing grouped track and artist names in the media store server. The process is performed by the catalog manager 210, specifically the content search module 212, the catalog converter and matcher 214 and the grouping module 215 of FIG. 3. In this example, while only music is discussed as a downloading object, video, game and any other multimedia applications may be grouped by the below-discussed process.

The grouping uses expected common information from the descriptive texts for the various content files. In the example artist name and track name (or song title) are combined as a "pair" for processing. Hence in our example, the content search module 212 searches and retrieves a pair formed by artist and track name of a content file from one or more of the vendors' catalogs. (S110) The artist and track pair is one example of descriptive text for the music, and the descriptive text for the music is not limited to the artist and track names. While the search can be performed based on only artist name or only track name, in this example, the pair of artist and track names are criteria for the search and therefore are manipulated in the subsequent processing for comparison and grouping. For discussion purposes, the retrieved artist and track names are set as "Hop-and-hip and Blue's," and "Doctor and Doom."

In the example, the retrieved pair of artist and track names is converted into a standard format, i.e. a token, for a searchable string or key by sequential parsing or changing text characters of the artist and track names. (S120) Each of the retrieved artist and track names in the pair is changed into the upper case. For example, if the retrieved pair of artist and track names is "Hop-and-hip and Blue's" sung by "Doctor and Doom," the track and artist names are converted to upper case, "HOP-AND-HIP AND BLUE'S," AND "DOCTOR AND DOOM." Then, to simplify the track and artist name, conventional terms included in track and artist name are removed from the track and artist name. The conventional terms coming out often in the artist and track name include items like "THE," "FEATURING," "FEAT," "FT.," "F.," "BY," and "AND." The removed conventional terms are restricted to the terms standing alone (e.g. "AND" is not removed from a non-standing alone term "CANDY."). In addition, for the simplification of the track and artist name, punctuation characters are removed from the track and artist name string. The punctuation characters include "!," "#," "-," "( )," "<" "_," etc. Spaces are also removed from the artist and track name pair. In the above example, after above conversion steps, the original artist and track names "Hop-and-hip and Blue's" and "Doctor and Doom" are converted to "HOPANDHIPBLUES," and "DOCTORDOOM." After the above conversion, the artist name and the track name are merged without space, and, in the above example, the merged artist and track name pair produces a token of "HOPANDHIPBLUESDOCTORDOOM." As an alternative way for forming a token, a predetermined number of characters of track name, e.g. '10,' and another predetermined number of characters of artist name, '5' are selected from the converted artist and track names, and then selected characters of artist name and selected characters of track name are merged to form a token. In this example, according to the alternative standardizing procedure, the token would become "HOPANDHIPBDOCTO." The selected numbers of characters of artist name and track name may change, and the accuracy of grouping changes depending upon the selected number of characters of artist name and track name.

After the token is obtained from the artist and track names, it is checked whether the obtained token exists in the catalog of the media store server. (S130) If the obtained token exists in the catalog of the media store server, which means a group of music consisting of music having the same token is already formed and stored in the catalog of the media store server. This essentially involves comparing the newly generated token with tokens that are already stored (exist) in the media store catalog. If there is a match, the newly generated token already exists in the catalog. If the newly generated token did not previously exist, there will be no match. If the token exist, the new content is identified with the existing group.

If the obtained token does not exist in the catalog of the media store server, a group of music consisting of music having the token has not previously been formed and stored in the catalog of the media store server.

If the token, in this example "HOPANDHIPBDOCTO," exists in the catalog of the media store server, the retrieved music "Hop-and-hip and Blue's" sung by "Doctor and Doom" is classified under the group having the token "HOPANDHIPBDOCTO." The content description from which the token was newly generated is assigned an already-existing integer grouping key corresponding to the token "HOPANDHIPBDOCTO." The key consists of a number, e.g. '1111' to be easily identified as that of the group of music having the token "HOPANDHIPBDOCTO." (S140) The assignment of the integer grouping key to the retrieved music "Hop-and-hip and Blue's" sung by "Doctor and Doom," and grouping of the retrieved music "Hop-and-hip and Blue's" sung by "Doctor and Doom" under the group having the integer grouping key are stored in the catalog of the media store server. In this way, content files related to the same music are assigned to the same group, even if resident on different vendors' server, stored in different formats (ringtone, ringback tone, MP3, videos) relate to different albums, collections, or performances, etc.

If the token, in this example "HOPANDHIPBDOCTO," does not exist in the catalog of the media store server, a new group of music consisting of music having the token "HOPANDHIPBDOCTO," and a new integer key, e.g. '1001' corresponding the new group of music are generated. In this situation, the generated new integer key '1001' is assigned to the music "Hop-and-hip and Blue's" sung by "Doctor and Doom." (S150) The assignment of the integer grouping key to the retrieved music "Hop-and-hip and Blue's" sung by "Doctor and Doom," and grouping of the retrieved music "Hop-and-hip and Blue's" sung by "Doctor and Doom" under the new group having the integer grouping key are stored in the catalog of the media store server. However, subsequently processed content descriptions for the same/related music will produce the same token and will receive the assignment of the integer 1001 (via steps S130 and S140), for grouping with the content descriptions that first produced the token.

As a result of grouping process of FIG. 6, diverse versions of same music, e.g. Ringtone and Ringback tone versions of music "Hop-and-hip and Blue's," are grouped and stored in the catalog of the media store server, under the same group, e.g. having the integer grouping key indicating the music in the group having the token e.g. "HOPANDHIPBDOCTO." The catalog of the media store server can present, in the catalog on the media store platform, groups of music with high accuracy classified according to track and artist names. The criteria for grouping the music can be other descriptive text for music such as album and collection names, and genre.

As shown by the above discussion, functions relating to the catalog grouping of multimedia contents based on the matching of descriptive text of music or the like, and implementing the media store platform, may be implemented on computers connected for data communication via the components of a packet data network, operating as the media store server as shown in FIG. 2. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the catalog manager 210. The software code is executable by the general-purpose computer that functions as the server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for matching and finding descriptive texts of music or the like in vendors' catalog with descriptive texts of music or the like in the media store's server, in essentially the manner performed in the implementations discussed and illustrated herein.

Figure 8:
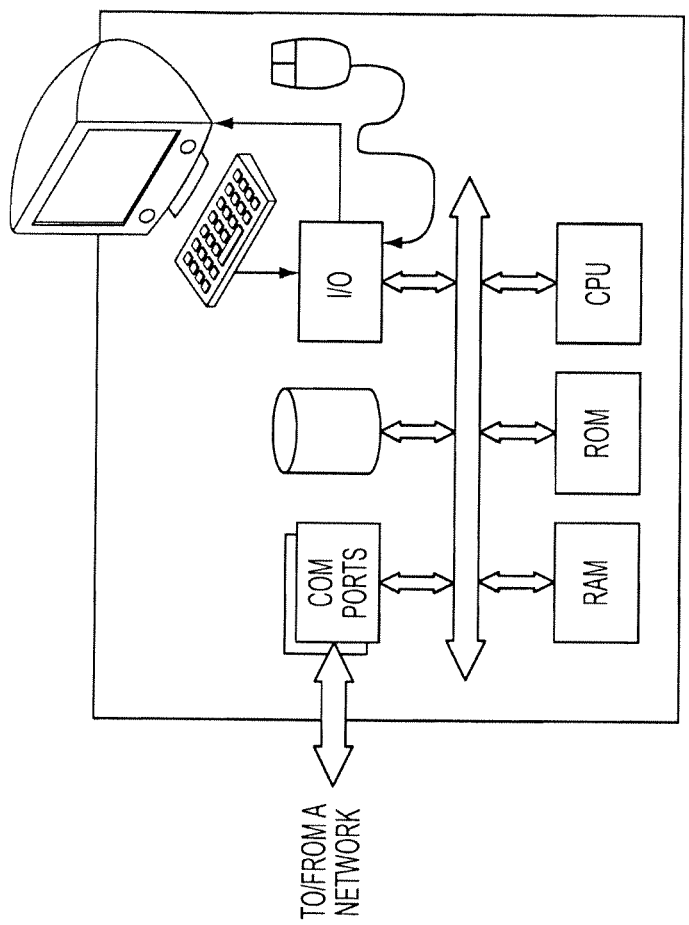
FIG. 8 depicts a computer with user interface elements, as may be used to implement a personal computer or other type of work station.
Figure 7:
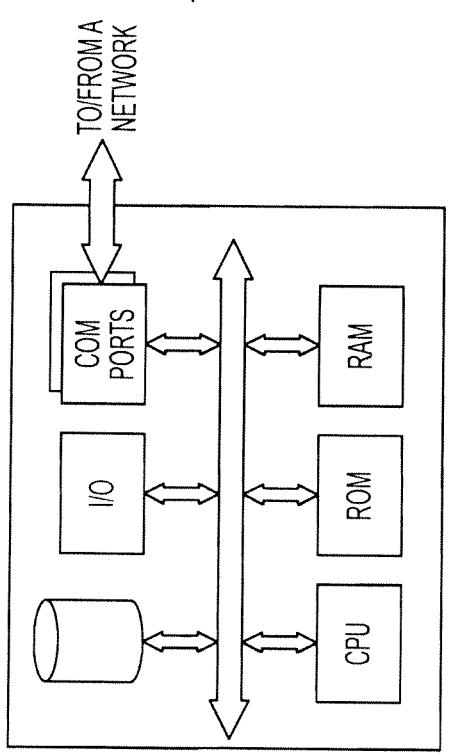
FIG. 7 illustrates a network or host computer platform, as may typically be used to implement a server.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

Hence, aspects of the methods of grouping contents for catalog purposes by processing the descriptive texts of music or the like, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator into the computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the catalog manager, the API, the media store platform, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
   storing, in a multimedia store server in communication with servers of a plurality of vendors of multimedia contents, a catalog identifying multimedia contents available from the plurality of vendors,
   wherein the catalog a) stores, for each of a plurality of the multimedia contents identified in the catalog, a descriptive text for the multimedia content, a token derived from the descriptive text, a link for accessing the multimedia content on a server of one of the plurality of vendors, and a grouping key number, distinct from the token, the grouping key number associating the multimedia content and other multimedia contents of the plurality having matching tokens and corresponding to diverse versions of a same music item or video item as the multimedia content and b) groups the multimedia contents having a common grouping key number in a common group;
   in response to receiving a search request for multimedia content in the catalog, identifying a multimedia content in the catalog for multimedia contents including a descriptive text matching the search request;
   returning a search result including the identified multimedia content and one or more other multimedia contents associated with the grouping key number of the identified multimedia content and corresponding to diverse versions of the same music item or video item as the identified multimedia content;
   in response to returning the search result receiving from a user a selection of one multimedia content included in the search result;
   retrieving from the catalog the link for accessing the selected multimedia content on a server of one of the piurality of vendors; and
   sending a notification to the server of the one of the plurality of vendors identified by the link to cause the server to deliver the selected multimedia content to a device of the user.

2. The method of claim 1, wherein the storing comprises:
   obtaining, in the multimedia store server, a descriptive text for a new multimedia content from a server of the plurality of vendors of multimedia contents;
   generating a token for the new multimedia content based on standardizing the descriptive text for the new multimedia content; and
   upon locating a token for a multimedia content in the catalog matching the generated token, storing a grouping key number for the new multimedia content in the catalog, wherein the grouping key number associates the new multimedia content and the multimedia content having the token matching the generated token.

3. The method of claim 1, wherein multimedia contents associated with the same grouping key number correspond to versions of a same music item or video item that are resident on different vendors' servers, that are stored in different formats, or that relate to different albums, collections, or performances.

4. The method of claim 1, further comprising:
in response to the selected multimedia content being delivered to the device of the user, sending a communication from the multimedia store server to the server of the one of the plurality of vendors relating to billing for the delivery of the selected multimedia content.

5. The method of claim 4, wherein the communication relating to billing is a communication relating to billing for delivery of a plurality of multimedia contents delivered by the server of the one of the plurality of vendors during a predetermined period of time.

6. The method of claim 1, wherein the user selection of the one multimedia content is associated with a request by the user to buy the selected multimedia content.

7. The method of claim 6, wherein the notification to cause the server to deliver the selected multimedia content is sent upon the user paying for purchase of the selected multimedia content using a pre-pay or post-pay payment method.

8. The method of claim 1, further comprising:
providing, by the multimedia store server, a media store platform enabling a user to search the catalog, purchase multimedia contents, and download multimedia contents to a digital information device,
wherein the multimedia store server generates a device-specific media store platform that is adjusted based on a type of the digital information device of the user.

9. The method of claim 1, wherein the catalog further identifies multimedia contents that are associated with featured artists, and identifies a sales ranking of multimedia contents in the catalog.

10. A server comprising:
a data communication interface for packet data communication with servers of a plurality of vendors of multimedia contents;
a catalog database for storing a catalog identifying multimedia contents available from the plurality of vendors,
wherein the catalog a) stores, for each of a plurality of the multimedia contents identified in the catalog, a descriptive text for the multimedia content, a token derived from the descriptive text, a link for accessing the multimedia content on a server of one of the plurality of vendors, and a grouping key number, distinct from the token, the grouping key number associating the multimedia content and other multimedia contents of the plurality having matching tokens and corresponding to diverse versions of a same music item or video item as the multimedia content and b) groups the multimedia contents having a common grouping key number in a common group; and
a media store platform interface for performing functions including functions to:
in response to receiving a search request for multimedia content in the catalog, identify a multimedia content in the catalog for multimedia contents including a descriptive text matching the search request;
return a search result including the identified multimedia content and one or more other multimedia contents associated with the grouping key number of the identified multimedia content and corresponding to diverse versions of the same music item or video item as the identified multimedia content;
in response to returning the search result, receive from a user a selection of one multimedia content included in the search result;
retrieve from the catalog the link for accessing the selected multimedia content on a server of one of the plurality of vendors; and
send a notification to the server of the one of the plurality of vendors identified by the link to cause the server to deliver the selected multimedia content to a device of the user.

11. The server of claim 10, wherein the media store platform interface is further configured to:
obtain a descriptive text for a new multimedia content from a server of the plurality of vendors of multimedia contents;
generate a token for the new multimedia content based on standardizing the descriptive text for the new multimedia content; and
upon locating a token for a multimedia content in the catalog matching the generated token, store a grouping key number for the new multimedia content in the catalog,
wherein the grouping key number associates the new multimedia content and the multimedia content having the token matching the generated token.

12. The server of claim 10, wherein multimedia contents associated with the same grouping key number correspond to versions of a same music item or video item that are resident on different vendors' servers, that are stored in different formats, or that relate to different albums, collections, or performances.

13. The server of claim 10, wherein the media store platform interface is further configured to:
in response to the selected multimedia content being delivered to the device of the user, send a communication to the server of the one of the plurality of vendors relating to billing for the delivery of the selected multimedia content.

14. The server of claim 13, wherein the communication relating to billing is a communication relating to billing for delivery of a plurality of multimedia contents delivered by the server of the one of the plurality of vendors during a predetermined period of time.

15. The server of claim 10, wherein the user selection of the one multimedia content is associated with a request by the user to buy the selected multimedia content.

16. The server of claim 15, wherein the notification to cause the server to deliver the selected multimedia content is sent upon the user paying for purchase of the selected multimedia content using a pre-pay or post-pay payment method.

17. The server of claim 10, wherein the media store platform interface is further configured to:
provide a media store platform enabling a user to search the catalog, purchase multimedia contents, and download multimedia contents to a digital information device,
wherein the server generates a device-specific media store platform that is adjusted based on a type of the digital information device of the user.

18. The server of claim 10, wherein the catalog further identifies multimedia contents that are associated with featured artists, and identifies a sales ranking of multimedia contents in the catalog.

* * * * *